United States Patent Office 3,663,549
Patented May 16, 1972

3,663,549
METHOD OF MAKING DIARYL HYDROXY-ETHYL TERTIARY AMINES
Raymond John Michaels, Jr., Mundelein, and Harold Elmer Zaugg, Lake Forest, Ill., assignors to Abbott Laboratories, Chicago, Ill.
No Drawing. Original application May 10, 1967, Ser. No. 637,350. Divided and this application Oct. 6, 1969, Ser. No. 870,925
Int. Cl. C07d 51/70
U.S. Cl. 260—268 TR                                    4 Claims

ABSTRACT OF THE DISCLOSURE

A novel series of diaryl hydroxyethyl tertiary amines represented by general Formulae I and II I 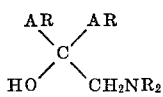

II 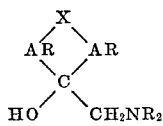

wherein AR represents an aryl radical, $NR_2$ signifies a tertiary amine in Formula I, and X represents O, S, $-NCH_3$, $-CH_2-CH_2-$, $-CH=CH-$ and a direct single bond, $NR_2$ is as previously described in Formula II. The novel method for making these compounds comprises first reacting the appropriate diaryl ketone with an alkali metal reducing agent, followed by alkylation with a sodium formaldehyde bisulphite derivative of a secondary amine to yield the final product. The compounds made according to this novel process are useful as antispasmodic agents.

CROSS REFERENCES

This application is a division of application Ser. No. 637,350, filed May 10, 1967, now abandoned.

DESCRIPTION OF INVENTION

According to known methods, diaryl hydroxyethyl tertiary amines are prepared by reacting a phenacyl secondary amine of the formula

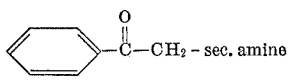

with a compound which is capable of adding a phenyl radical by splitting the double bond of the keto carbon atom, such as bromobenzene or chlorobenzene. Alternatively, a two step method may be employed by reacting the desired tertiary amine with ethyl chloroacetate to form the tertiary amine acetic acid ethyl ester. This compound is then reacted with a Grignard reagent such as phenylmagnesium halide to form the diaryl hydroxyethyl tertiary amine. However, there is no known method for making such compounds by reductively alkylating a diaryl ketone.

The process disclosed herein utilizes a diaryl keto derivative as the starting material which is reacted with a reducing agent to split the double bond of the carbonyl radical. This reduction step is carried out with an alkali metal derivative such as sodium sand. The product of this reaction is a disodiodiaryl intermediate, which is in turn alkylated by reacting it with a sodium formaldehyde bi-sulphite derivative of a secondary amine yielding the desired product.

The sequence of the foregoing steps may be represented by the following:

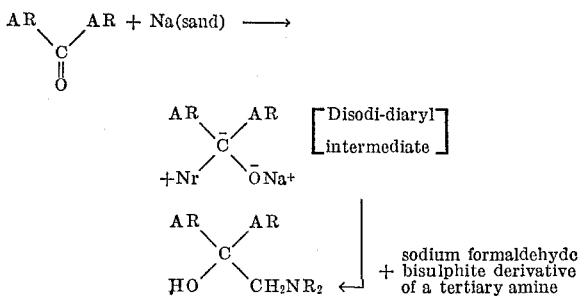

This method requires the use of a diaryl ketone, that is, the starting material must have two aromatic rings bonded to the carbonyl radical. The first step of the process adds two electrons to the keto group in forming the disodio intermediate thereby splitting the double bond. The double aromatic ring system functions to de-localize the double negative charge in order to obtain complete conversion of the starting material to the disodio derivative.

The sodium formaldehyde bisulphite derivative of secondary amines are compounds having the structural formula

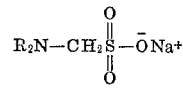

Hence, these compounds have a carbon-sulfur bond rather than a carbon-oxygen bond. This fact is significant since a carbon-sulfur bond is usually relatively stable and one would not expect such a bond to readily split to obtain complete displacement of the sodium sulfite group. However, it has now been found that this sodium formaldehyde bisulphite derivative of a secondary amine will react with a disodio-diaryl intermediate to form a diaryl-hydroxy-ethyl secondary amine in good yields indicating almost complete displacement of the sodium bisulphite radical.

The sodium formaldehyde bisulphite derivative of a secondary amine is prepared by reacting sodium formaldehyde bisulphite with the desired tertiary amine. Specifically, the tertiary amines which may be utilized within the scope of this invention include N-loweralkyl piperazine, piperidine, pyrrolidine, N-loweralkyl homopiperazine and dialkyl amine having 1-4 carbon atoms. If desired, the cyclic amines may be substituted with loweralkyl radicals, such as for example, N-methyl piperazine. The sodium formaldehyde bisulphite derivative of the secondary amine recovered from the reaction mixture may then be reacted with the disodio-diaryl intermediate to carry out the desired reductive alkylation.

The compounds which can be made according to this invention may be generically designated as diaryl hydroxy-ethyl tertiary amines. Structurally, these compounds may be represented by both Formula I and Formula II:

I 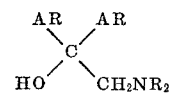

II 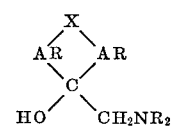

wherein AR representes an aryl radical, $NR_2$ signifies a tertiary amine selected from the group consisting of N-loweralkyl piperazine, piperidine, pyrrolidine, N-loweralkyl homopiperazine and dialkylamine, and X is a member selected from the group consisting of oxygen, sulfur, methylimino, —CH$_2$CH$_2$—, —CH=CH— and a direct single bond. Formula II differs from Formula I only by a direct or indirect bond between the two aryl radicals ortho to the positions at which the amino alcohol group is bonded. Both structures, however, represent diaryl hydroxyethyl tertiary amines and both are considered to be within the scope of this invention.

The following examples are presented to exemplify a few specific embodiments of the novel compounds and process of this invention but are not intended to limit the scope thereof.

EXAMPLE I

Preparation of sodium-N-methyl-N'-piperazinomethane sulfonate

To a stirred solution of 80.5 grams (0.6 mole) of sodium formaldehyde bisulphite in 50 cc. of water is added 65.0 grams (0.65 mole) of N-methylpiperazine dropwise over a period of 15 minutes. Heat is evolved and the reaction temperature is kept below 50° C. by means of an ice bath. This mixture is stirred for one hour at room temperature and then poured into 500 cc. of acetone. Upon cooling, the product precipitates out of solution and is then filtered and dried at 100° C. for 24–48 hours in a vacuum oven. Approximately 104.8 grams of sodium-N-methyl-N'-piperazinomethane sulfonate having a melting point of 188°–190° C. is recovered representing a yield of about 80.8%.

In a similar manner, the procedure of Example I may be followed to prepare such compounds as sodium-N-piperidinomethane sulfonate, sodium-N-methyl-N'-homopiperazinomethane sulfonate, sodium-N-pyrrolidinomethane sulfonate as well as other sodium formaldehyde bisulphite derivatives of secondary amines.

EXAMPLE II 1-(2',2'-diphenyl-2'-hydroxyethyl)-4-methylpiperazine

Sodium sand is prepared from 3.5 grams (0.15 mole) of sodium in a 250 cc. 3-neck flask fitted with a 5000 r.p.m. stirrer and glass blade, nitrogen gas inlet tube and a condenser protected with a soda lime drying tube. A 75 cc. portion of toluene is added and the suspension is stirred and refluxed for about 10 minutes. The sodium sand is now prepared.

The toluene is decanted and replaced with 50 cc. of freshly distilled 1,2-dimethoxyethane, and the condenser is replaced with a thermometer. To the stirred suspension under a nitrogen atmosphere is added 9.1 grams (0.05 mole) of benzophenone in 50 cc. of 1,2-dimethoxyethane dropwise. Heat is evolved and the temperature increases slowly to 45° C. during the addition. The mixture becomes deep blue in color changing to purple. The mixture is stirred for about 1½ hours at room temperature, then cooled to —50° C. in a Dry Ice-acetone bath. To this cooled mixture is added 13.0 grams (0.06 mole) of sodium-N-methyl-N'-piperazinomethane sulfonate in one portion. The cooling bath is removed and the mixture is stirred for 19 hours at room temperature.

Upon continued stirring, the color changes to brownish purple. The nitrogen atmosphere is maintained and 50 cc. of water is cautiously added dropwise. Dilute hydrochloric acid is added until the mixture is acidic. The aqueous acid layer is separated and the organic portion is extracted with dilute hydrochloride acid once again. With an ice cooling bath, the combined acid extracts are made strongly alkaline by the slow addition of 50% sodium hydroxide solution. The liberated base is extracted with ether; the mixture is dried over anhydrous magnesium sulfate, filtered and concentrated to dryness, yielding 13.5 grams of 1'(2',2' - diphenyl - 2' - hydroxyethyl)-4-methylpiperazine which crystallizes to an oily solid. The product may be washed with cold pentane to give a crystalline solid having a melting point of 81°–83° C.

The procedure of Example II may be followed to prepare other diaryl hydroxyethyl secondary amines by substituting an equimlar proportion of the desired diaryl ketone in the place of benzophenone. Table I below lists the diaryl ketone and the secondary amine used as starting materials, the product made thereby and the melting point of each of the products of a representative class of compounds made according to this invention.

TABLE I

| Ex. | Starting material | Product | M.P. in ° C. |
|---|---|---|---|
| 3 | Fluoren-9-one and dimethylamine. | 9-dimethylaminomethyl fluoren-9-ol. | 82–83 |
| 4 | Fluoren-9-one and pyrrolidine. | 9-(1-pyrrolidinylmethyl) fluoren-9-ol. | 115–116 |
| 5 | Fluoren-9-one and 1-methylpiperazine. | 9-[(4-methyl-1-piperazinyl) methyl]fluoren-9-ol. | 175–176 |
| 6 | 5H-dibenzo[a,d]-cyclohepten-5-one and 1-methylpiperazine. | 5-[(4-methyl-1-piperazinyl) methyl]-5H-dibenzo-[a,d] cyclohepten-5-ol. | 124–125 |
| 7 | 10,11-dihydro-5H-dibenzo [a,d]-cyclohepten-5-one and 1-methylpiperazine. | 10,11-dihydro-5[(4-methyl-1-piperazinyl)methyl]-5H-dibenzo[a,d]-cyclohepten-5-ol. | 131–132 |
| 8 | Xanthen-9-one and dimethylamine. | 9-dimethylaminomethyl-xanthen-9-ol. | 105–106 |
| 9 | Xanthen-9-one and pyrrolidine. | 9-(1-pyrrolidinylmethyl) xanthen-9-ol. | 115–116 |
| 10 | Xanthen-9-one and 1-methylpiperazine. | 9-[(4-methyl-1-piperazinyl) methyl]xanthen-9-ol. | 169–170 |
| 11 | Thioxanthen-9-one and pyrrolidine. | 9-(1-pyrrolidinyl)methyl thioxanthen-9-ol. | 90–91 |
| 12 | Thioxanthen-9-one and 1-methylpiperazine. | 9[(4-methyl-1-piperazinyl) methyl]thioxanthen-9-ol. | 111–112 |

The compounds prepared according to this invention are effective as antispasmodic agents and as central nervous system depressants. Generally, these compounds are more conveniently administered in the form of non-toxic acid-addition salts such as the hydrochloride, phosphoric, acetic, tartaric, dihydrochloride and maleate, among others. When administered to warm-blooded animals, these compounds exhibit antispasmodic activity such as reducing gastrointestinal secretions and the like. For example, an oral dose of between 0.5 milligrams per kilogram of body weight of the dihydrochloride salt of the compound of Example II when administered to fowl markedly depresses the rate of food passage through the intestinal tract evidencing good antispasmodic activity.

The non-toxic salts of compounds as represented by those specifically listed in Table I similarly show activity as central nervous system depressants as well as antispasmodic agents. These compounds may conveniently be formulated and administered orally as tablets, capsules and solutions, or intravenously, intramuscularly or intraperitoneally when admixed with suitable non-toxic pharmaceutical carriers. For example, a dose of 100 milligrams per kilogram of body weight of the dimaleate salt of 9[(4-methyl-1-piperazinyl)methyl]fluoren-9-ol when administered to mice intraperitoneally, exhibits a marked decrease in activity as well as a decrease in the respiratory rate. Similarly, the intraperitoneal administration of a dose of 100 milligrams per kilogram of body weight of 9[(4-methyl-1-homopiperazino)methyl]xanthen-9-ol again exhibits a marked decrease in activity as well as a decrease in the respiratory rate of the mice.

We claim:

1. A method of preparing diaryl hydroxyethyl tertiary amines of the formulae

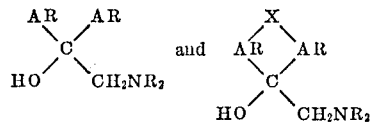

wherein AR represents an aryl group, X is a member selected from the group consisting of oxygen, sulfur, methylimino, —CH=CH—, —CH$_2$—CH$_2$— and a direct single bond, and NR$_2$ is a member selected from the group consisting of N-loweralkyl piperazino, pyrrolidino, N- loweralkyl homopiperazino, diloweralkylamino and piperidino which comprises the steps of reacting the appropriate diaryl ketone with an alkali metal reducing agent, alkylating this product with an appropriate sodium formaldehyde bisulphite secondary amine having the formula

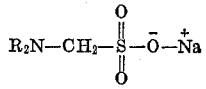

wherein $R_2N$ is as described above, and recovering the diaryl hydroxyethyl tertiary amine from the reaction mixture.

2. A method according to claim 1 wherein the alkali metal reducing agent consists of sodium sand.

3. A method according to claim 1 wherein the diaryl ketone is reacted with the alkali metal reducing agent under a nitrogen atmosphere, cooling the resulting reaction mixture to between $-30°$ and $-60°$ C., adding the sodium formaldehyde bisulphite derivative of a secondary amine to the cooled reaction mixture maintained in a nitrogen atmosphere, warming and continuing the reaction at room temperature and recovering the diaryl hydroxyethyl tertiary amine.

4. A method according to claim 1 wherein AR is selected from the group of phenyl, benzyl, fluorenyl, xanthenyl or thioxanthenyl.

References Cited
UNITED STATES PATENTS

| | | | |
|---|---|---|---|
| 2,827,460 | 3/1958 | Stein | 260—294.7 |
| 2,946,793 | 7/1960 | Michaels et al. | 260—268 |
| 2,980,683 | 4/1961 | Zaugg et al. | 260—268 |
| 3,160,665 | 12/1964 | Siegrist et al. | 260—570 X |
| 3,219,700 | 11/1965 | O'Shea | 260—570 X |
| 3,420,848 | 1/1969 | Jucker | 260—326.81 |
| 3,429,921 | 2/1969 | Hjelte | 260—570.8 |

DONALD G. DAUS, Primary Examiner

U.S. Cl. X.R.

260—239 BC, 268 R, 268 BZ, 243.4 C, 274.7, 326.5 C, 326.81, 327 B, 335, 570 R, 570.6, 570.8 TC, 999